United States Patent Office 3,335,157
Patented Aug. 8, 1967

3,335,157
[(2,5 - DIHYDROXYPHENYL SULFONYL)CYCLO-PENTADIENYL]MANGANESE TRICARBONYLS
John Kozikowski, Walled Lake, Mich., and Michael Cais, Haifa, Israel, assignors to Ethyl Corporation, New York, N.Y., a corporation of Virginia
No Drawing. Original application Aug. 12, 1960, Ser. No. 49,135. Divided and this application May 13, 1963, Ser. No. 283,138
1 Claim. (Cl. 260—429)

This application is a division of application Ser. No. 49,135, filed Aug. 12, 1960, now abandoned.

This invention relates to a variety of organometallic compounds and the processes employed in their production. More specifically, this invention relates to compounds and processes involving the use of a cyclopentadienyl sulfinic acid manganese tricarbonyl compound.

An object of our invention is to provide new organometallic compounds and processes for their preparation. A further object is to provide cyclopentadienyl manganese tricarbonyl derivatives and processes for their preparation. Additional objects will become apparent from a reading of the specification and claim which follows.

The objects of this invention are accomplished by providing [(2,5-dihydroxyphenyl sulfonyl)cyclopentadienyl] manganese tricarbonyls obtained by reacting a cyclopentadienyl sulfinic acid manganese tricarbonyl compound having the formula

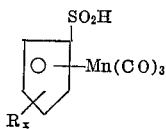

with a quinone having at least one unsubstituted position. As an illustration of this reaction, there is presented the following example in which all parts and percentages are by weight unless otherwise indicated.

Example I

Three and one-half grams of (sulfinocyclopentadienyl) manganese tricarbonyl in 50 ml. of ethanol was mixed with a solution of technical grade p-benzoquinone (1.5 grams) in 50 ml. of ethanol. The mixture was heated for 10 minutes on the steam bath, and was cooled and diluted with 400 ml. of water containing a few drops of concentrated hydrochloric acid. The brown precipitate which formed was filtered off, dissolved in ether, and boiled with activated carbon (Norit-A, produced by Pfanstiehl Chemical Company). The mixture was then filtered, and the filtrate was dried over sodium sulfate and diluted with petroleum ether. There was obtained 2.5 grams of a cream-colored precipitate having a melting point of 197–199° C. The mother liquor filtrate was evaporated and the residue, after crystallization from benzene, yielded an additional 0.9 gram of the cream-colored crystals having a melting point of 197–199° C. The total yield of product was 70.5 percent. An analytical sample was obtained by an additional recrystallization from benzene and had a melting point of 198–199° C. This product was proved to be [(2,5 - dihydroxphenylsulfonyl)cyclopentadienyl] manganese tricarbonyl. Found: C, 45.0; H, 2.50; Mn, 14.5; S, 8.72 percent. Calculated for $C_{14}H_8MnO_7S$: C, 44.7; H, 2.41; Mn, 14.6; S, 8.52 percent. The infrared spectrum of the product in KBr pellet showed the two typical strong sulfone bands in the 1100 cm.$^{-1}$ and 1300 cm.$^{-1}$ regions.

The preparation of cyclopentadienyl sulfinic acid manganese tricarbonyls, the starting materials in this invention, as well as the preparation of other related cyclopentadienyl manganese tricarbonyl compounds is fully described in our copending applications Ser. No. 283, 139 and Ser. No. 283,140, filed May 13, 1963, now respectively U.S. Patent Nos. 3,205,245 and 3,205,246, issued Sept. 7, 1965.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknocks component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous planting technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of [(methylsulfonyl)cyclopentadienyl] manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claim.

We claim:

[(2,5 - dihydroxyphenylsulfonyl)cyclopentadienyl]manganese tricarbonyl.

(References on following page)

References Cited

UNITED STATES PATENTS 3,028,406  4/1962  Brantley _____ 260—429

FOREIGN PATENTS 572,013  3/1959  Canada.

OTHER REFERENCES

Cais et al. Chemistry and Industry (Feb. 20, 1960), page 202.

Cotton et al., Chemistry and Industry (1958), pages 1368–9.

Kozikowski et al., Jour. Am. Chem. Soc., vol. 81 (1959), pages 2995–7.

Migrdichian, Organic Synthesis, Reinhold Publishing Corporation, New York, N.Y., vol. II (1957), page 1712.

TOBIAS E. LEVOW, *Primary Examiner.*

A. P. DEMERS, *Assistant Examiner.*